(12) United States Patent
Yamamoto et al.

(10) Patent No.: US 11,591,109 B2
(45) Date of Patent: Feb. 28, 2023

(54) ABNORMALITY DETECTION DEVICE AND CONTROL DEVICE

(71) Applicants: TOYOTA JIDOSHA KABUSHIKI KAISHA, Toyota (JP); SkyDrive Inc., Shinjuku-ku (JP)

(72) Inventors: Kenichi Yamamoto, Nagoya (JP); Toshio Ando, Toyota (JP)

(73) Assignees: TOYOTA JIDOSHA KABUSHIKI KAISHA, Toyota (JP); SkyDrive Inc., Shinjuku-ku (JP)

( * ) Notice: Subject to any disclaimer, the term of this patent is extended or adjusted under 35 U.S.C. 154(b) by 752 days.

(21) Appl. No.: 16/540,127

(22) Filed: Aug. 14, 2019

(65) Prior Publication Data

US 2020/0102089 A1     Apr. 2, 2020

(30) Foreign Application Priority Data

Oct. 1, 2018   (JP) .............................. JP2018-186480

(51) Int. Cl.
*B64D 45/00*   (2006.01)
*B64C 27/20*   (2023.01)
*B64C 27/80*   (2006.01)

(52) U.S. Cl.
CPC .......... *B64D 45/0005* (2013.01); *B64C 27/20* (2013.01); *B64C 27/80* (2013.01); *B64C 2201/14* (2013.01); *B64C 2201/162* (2013.01); *B64D 2045/0085* (2013.01)

(58) Field of Classification Search
CPC ........ B64D 45/0005; B64D 2045/0085; B64C 27/20; B64C 27/80; B64C 2201/14; B64C 2201/162; B64C 2201/027; B64C 2201/042; B64C 2201/108; B64C 39/024;
(Continued)

(56) References Cited

U.S. PATENT DOCUMENTS

2018/0244367 A1*  8/2018  Kiesewetter .......... B64C 39/024
2019/0176979 A1   6/2019  Baba et al.

FOREIGN PATENT DOCUMENTS

| CN | 103072690 | 5/2013 |
| CN | 107219757 | 9/2017 |
| CN | 107226206 | 10/2017 |

(Continued)

OTHER PUBLICATIONS

Chinese Office Action dated Nov. 2, 2022, in Chinese patent application No. CN 201910860622.4 (Partial English translation only).

*Primary Examiner* — Valentina Xavier

(74) *Attorney, Agent, or Firm* — Oblon, McClelland, Maier & Neustadt, L.L.P.

(57) ABSTRACT

Provided is an abnormality detection device for a rotary wing unit. The rotary wing unit includes a plurality of rotary wings that is coaxially disposed. The abnormality detection device includes a controller configured to acquire at least one of a correlation at the time of normal operation between operation parameters related to the rotary wings and a correlation at the time of abnormal operation between the operation parameters and detect abnormality of the rotary wing unit, based on a correlation at the time of actual operation between the operation parameters and at least one of the correlation at the time of normal operation and the correlation at the time of abnormal operation.

5 Claims, 5 Drawing Sheets

(58) Field of Classification Search
CPC ....... B64C 27/10; B64C 27/006; B64C 27/14; B64C 2201/024
See application file for complete search history.

(56) References Cited

FOREIGN PATENT DOCUMENTS

| | | | | |
|---|---|---|---|---|
| CN | 107463183 A | * | 12/2017 | ............. A63H 30/04 |
| EP | 3406522 A1 | * | 11/2018 | ............. B64C 11/06 |
| JP | 2002-316699 A | | 10/2002 | |
| JP | 2017-47736 A | | 3/2017 | |
| JP | 2017-534900 A | | 11/2017 | |
| JP | 2018-030568 | | 3/2018 | |
| WO | WO-03091099 A2 | * | 11/2003 | ............. B64C 27/10 |
| WO | WO 2016/048897 A1 | | 3/2016 | |
| WO | WO 2018/084261 A1 | | 5/2018 | |
| WO | WO-2018110598 A1 | * | 6/2018 | ........... B64C 39/024 |

* cited by examiner

ABNORMALITY DETECTION DEVICE AND CONTROL DEVICE

INCORPORATION BY REFERENCE

The disclosure of Japanese Patent Application No. 2018-186480 filed on Oct. 1, 2018 including the specification, drawings and abstract is incorporated herein by reference in its entirety.

BACKGROUND

1. Technical Field

The present disclosure relates to an abnormality detection device and a control device.

2. Description of Related Art

In the related art, an unmanned rotorcraft having a plurality of rotary wing units is known (refer to, for example, Japanese Unexamined Patent Application Publication No. 2017-047736 (JP 2017-047736 A)).

The unmanned rotorcraft disclosed in JP 2017-047736 A is configured to automatically land in a case where a failure of a rotary wing unit is detected. The rotary wing unit includes a rotary wing that generates lift, and a motor that rotates the rotary wing. This unmanned rotorcraft is configured to determine that the motor is broken down, in a case where a deviation between a target value of a rotational speed of the motor and an actual rotational speed of the motor, which is detected by a sensor, is large.

SUMMARY

Here, in the rotary wing units, there is also a rotary wing unit in which a plurality of rotary wings is coaxially disposed. Also in such a rotary wing unit, in a case where abnormality occurs, it is desirable that the abnormality is appropriately detected.

The present disclosure provides an abnormality detection device and a control device, in which it is possible to appropriately detect abnormality of a rotary wing unit in which a plurality of rotary wings is coaxially disposed.

A first aspect of the present disclosure relates to an abnormality detection device for a rotary wing unit. The rotary wing unit includes a plurality of rotary wings that is coaxially disposed. The abnormality detection device includes a controller configured to acquire at least one of a correlation at the time of normal operation between operation parameters related to the rotary wings and a correlation at the time of abnormal operation between the operation parameters, and detect abnormality of the rotary wing unit, based on a correlation at the time of actual operation between the operation parameters and at least one of the correlation at the time of normal operation and the correlation at the time of abnormal operation.

According to the first aspect, since the rotary wings that are coaxially disposed influence each other during operation, it is possible to appropriately detect abnormality by using a correlation during operation.

In the abnormality detection device according to the first aspect, the rotary wing unit may include a duct, and the rotary wings may be disposed in the duct.

In the abnormality detection device according to the first aspect, the operation parameters may include a rotational speed of a motor that rotates the rotary wing.

In the abnormality detection device according to the first aspect, the rotary wing unit may be configured to change a pitch angle of the rotary wing, and the operation parameters may include a pitch angle of the rotary wing.

A second aspect of the present disclosure relates to a control device for a flying object. The flying object includes a plurality of rotary wing units, each of the rotary wing units includes a plurality of rotary wings coaxially disposed. The control device includes a controller configured to acquire at least one of a correlation at the time of normal operation between operation parameters related to the rotary wings and a correlation at the time of abnormal operation between the operation parameters, detect abnormality of the rotary wing unit, based on a correlation at the time of actual operation between the operation parameters and at least one of the correlation at the time of normal operation and the correlation at the time of abnormal operation, and perform control at the time of abnormality in a case where the abnormality of the rotary wing unit is detected.

According to the second aspect, since the rotary wings that are coaxially disposed influence each other during operation, it is possible to appropriately detect abnormality by using a correlation during operation.

According to each of the aspects of the present disclosure, it is possible to appropriately detect the abnormality of the rotary wing unit in which a plurality of rotary wings is coaxially disposed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described based on the drawings.

First, a flight system 100 according to an embodiment of the present disclosure will be described with reference to FIGS. 1 and 2.

Figure 1:
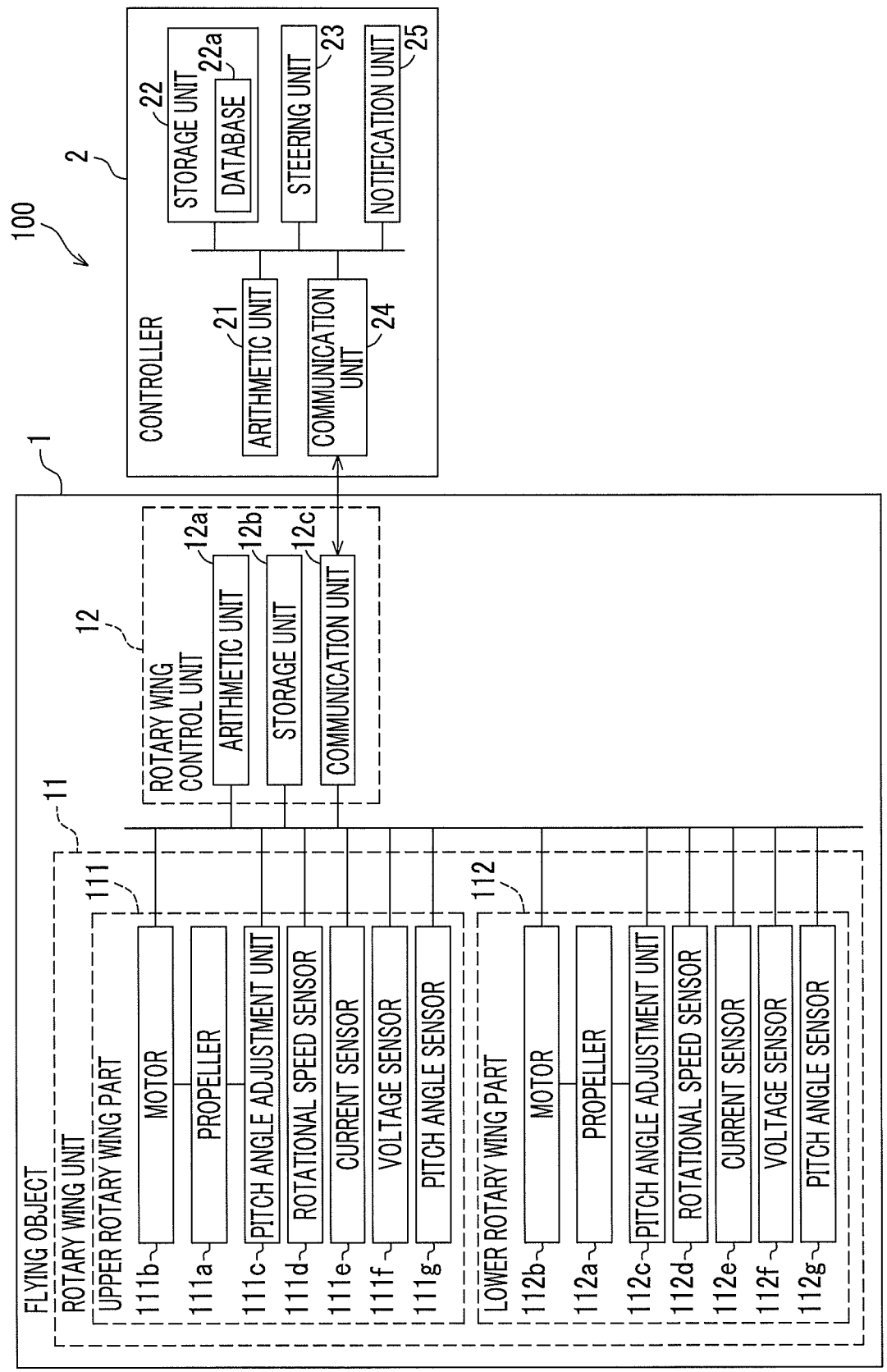
FIG. 1 is a block diagram showing an example of a flight system according to an embodiment.

As shown in FIG. 1, the flight system 100 includes a flying object 1 that is, for example, an unmanned rotorcraft, and a controller 2 that controls the flying object 1. The controller 2 is an example of an "abnormality detection device" and a "control device" according to the embodiment of the present disclosure.

The flying object 1 is configured to fly based on a steering signal or the like, which is received from the controller 2. The flying object 1 includes a plurality of rotary wing units 11 and a rotary wing control unit 12 that controls the rotary wing units 11. The rotary wing units 11 are configured to generate lift and are disposed at predetermined intervals at an outer edge portion of the flying object 1 when viewed in a plan view. In FIG. 1, for simplification, one rotary wing unit 11 among the rotary wing units 11 is shown.

Figure 2:
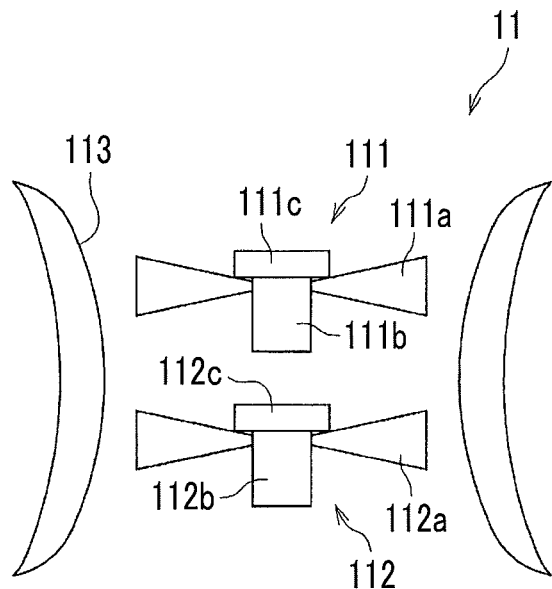
FIG. 2 is a schematic diagram showing a rotary wing unit of the flight system of FIG. 1.

As shown in FIG. 2, the rotary wing unit 11 includes an upper rotary wing part 111, a lower rotary wing part 112, and a duct 113. The upper rotary wing part 111 and the lower rotary wing part 112 are disposed in the duct 113 and disposed to be arranged in a vertical direction. The upper rotary wing part 111 is disposed above the lower rotary wing part 112 in the duct 113, and the lower rotary wing part 112 is disposed below the upper rotary wing part 111 in the duct 113.

As shown in FIG. 1, the upper rotary wing part 111 has a propeller 111a, a motor 111b, a pitch angle adjustment unit 111c, a rotational speed sensor 111d, a current sensor 111e, a voltage sensor 111f, and a pitch angle sensor 111g. The propeller 111a is connected to a rotary shaft of the motor 111b. The motor 111b is configured to rotate the propeller 111a. The pitch angle adjustment unit 111c has a servomotor (not shown) for adjusting a pitch angle (a rotational angle around a right-left axis) of the propeller 111a. The rotational speed sensor 111d is provided to detect a rotational speed (the number of rotations per unit time) of the motor 111b. The current sensor 111e is provided to detect an electric current flowing to the motor 111b, and the voltage sensor 111f is provided to detect voltage that is input to the motor 111b. The pitch angle sensor 111g is provided to detect the pitch angle of the propeller 111a.

The lower rotary wing part 112 has a propeller 112a, a motor 112b, a pitch angle adjustment unit 112c, a rotational speed sensor 112d, a current sensor 112e, a voltage sensor 112f, and a pitch angle sensor 112g. The propeller 112a is connected to a rotary shaft of the motor 112b. The motor 112b is configured to rotate the propeller 112a. The pitch angle adjustment unit 112c has a servomotor (not shown) for adjusting a pitch angle of the propeller 112a. The rotational speed sensor 112d is provided to detect a rotational speed of the motor 112b. The current sensor 112e is provided to detect an electric current flowing to the motor 112b, and the voltage sensor 112f is provided to detect voltage that is input to the motor 112b. The pitch angle sensor 112g is provided to detect the pitch angle of the propeller 112a.

That is, in the rotary wing unit 11, a plurality of (two) propellers 111a, 112a are coaxially disposed. That is, the propellers 111a, 112a are disposed at corresponding (overlapping) positions when viewed in a plan view, and the rotary shaft of the propeller 111a and the rotary shaft of the propeller 112a are disposed to be arranged in the vertical direction. The propellers 111a, 112a may be configured to be rotated in the opposite directions, or may be configured to be rotated in the same direction. The propellers 111a, 112a are examples of a "rotary wing" in the present disclosure.

The rotary wing control unit 12 is configured to control the motor 111b and the pitch angle adjustment unit 111c of the upper rotary wing part 111 and the motor 112b and the pitch angle adjustment unit 112c of the lower rotary wing part 112, based on the steering signal or the like received from the controller 2. The rotary wing control unit 12 includes an arithmetic unit 12a, a storage unit 12b, and a communication unit 12c. The arithmetic unit 12a is configured to control the rotary wing control unit 12 by executing arithmetic processing, based on various control programs, maps, or the like stored in the storage unit 12b. Various control programs, maps that are referred to when the various control programs are executed, or the like is stored in the storage unit 12b. The communication unit 12c is provided to communicate with the controller 2. The communication unit 12c is configured to receive the steering signal that is transmitted from the controller 2 and transmit the detection result of each sensor of the rotary wing unit 11 to the controller 2.

The controller 2 is configured to transmit the steering signal so as to control the flight of the flying object 1. The controller 2 includes an arithmetic unit 21, a storage unit 22, a steering unit 23, a communication unit 24, and a notification unit 25. The arithmetic unit 21 is configured to control the controller 2 by executing arithmetic processing, based on various control programs, maps, or the like stored in the storage unit 22. Various control programs, maps that are referred to when the various control programs are executed, or the like is stored in the storage unit 22. The steering unit 23 is provided to receive a steering operation by an operator. The communication unit 24 is provided to communicate with the flying object 1. The communication unit 24 is configured to transmit the steering signal corresponding to an input or the like to the steering unit 23 to the flying object 1 and receive the detection result of each sensor of the rotary wing unit 11. The arithmetic unit 21 is an example of a "detection unit" and a "control unit" in the present disclosure.

Further, the controller 2 is configured to calculate an operating state, based on the detection result of each sensor of the rotary wing unit 11, and detect abnormality of the rotary wing unit 11, based on the operating state. The notification unit 25 is, for example, a display or a speaker, and is configured to notify the operator of the abnormality of the rotary wing unit 11 in a case where the abnormality of the rotary wing unit 11 is detected. The controller 2 is configured to acquire, for example, the operating states of all the rotary wing units 11, and perform abnormality detection with respect to all the rotary wing units 11.

Here, in the rotary wing unit 11, the propellers 111a, 112a are coaxially disposed and the propellers 111a, 112a influence each other during operation. Therefore, a database 22a is stored in the storage unit 22 of the controller 2, and the correlation (operating state) between the propellers 111a, 112a at the time of normal operation is accumulated in the database 22a in advance. The correlation between various operation patterns of the propellers 111a, 112a at the time of normal operation is accumulated in the database 22a. A specific example of the database 22a is shown in Table 1.

TABLE 1

| Operation pattern at time of normal operation | Upper rotary wing part | | | Lower rotary wing part | | |
|---|---|---|---|---|---|---|
| | Rotational speed | Torque | Pitch angle | Rotational speed | Torque | Pitch angle |
| Pt1 | Nu1 | Tu1 | Au1 | Nl1 | Tl1 | Al1 |
| Pt2 | Nu1 | Tu2 | Au2 | Nl2 | Tl2 | Al2 |
| . | . | . | . | . | . | . |
| . | . | . | . | . | . | . |
| . | . | . | . | . | . | . |

In the database 22a, as shown in Table 1, three items related to the propeller 111a of the upper rotary wing part 111 and three items related to the propeller 112a of the lower rotary wing part 112 are set, and a total of six items are set. Specifically, as the items of the database 22a, rotational speeds of the motors 111b, 112b, torques of the motors 111b, 112b, and pitch angles of the propellers 111a, 112a are set.

For example, a case where the rotational speed of the motor 111b is Nu1, the torque of the motor 111b is Tu1, the pitch angle of the propeller 111a is Au1, the rotational speed of the motor 112b is N11, the torque of the motor 112b is T11, and the pitch angle of the propeller 112a is Al1 is accumulated in the database 22a as an operation pattern Pt1 at the normal time. Similarly, a case where the rotational speed of the motor 111b is Nu2, the torque of the motor 111b is Tu2, the pitch angle of the propeller 111a is Au2, the rotational speed of the motor 112b is N12, the torque of the motor 112b is T12, and the pitch angle of the propeller 112a is Al2 is accumulated in the database 22a as an operation pattern Pt2 at the normal time. In Table 1, for simplification, solely the operation patterns Pt1, Pt2 are shown. However, a large number of operation patterns at the normal time are accumulated in the actual database 22a. The large number of operation patterns at the normal time are obtained in advance by simulation or experiment. Further, each item of the operation pattern at the normal time may be a predetermined value obtained in advance, or may be a predetermined range obtained in advance.

The controller 2 is configured to detect the abnormality of the rotary wing unit 11, based on the correlation (the operating state of the rotary wing unit 11) at the time of actual operation and the correlation at the time of normal operation accumulated in the database 22a. Specifically, the controller 2 is configured to acquire sensor values at the time of actual operation, calculate data for comparison, collate the data for comparison with the database 22a, and determines that in a case where there is no matching data (operation pattern), it is abnormal.

Here, the torque of the motor 111b is calculated based on, for example, the detection result of the current sensor 111e, and the torque of the motor 112b is calculated based on, for example, the detection result of the current sensor 112e. For this reason, the detection result of the rotational speed sensor 111d, the detection result of the current sensor 111e, the detection result of the pitch angle sensor 111g, the detection result of the rotational speed sensor 112d, the detection result of the current sensor 112e, and the detection result of the pitch angle sensor 112g are included in the sensor values described above. Then, the rotational speed of the motor 111b, which is detected by the rotational speed sensor 111d, the torque of the motor 111b, which is calculated from the detection result of the current sensor 111e, the pitch angle of the propeller 111a, which is detected by the pitch angle sensor 111g, the rotational speed of the motor 112b, which is detected by the rotational speed sensor 112d, the torque of the motor 112b, which is calculated from the detection result of the current sensor 112e, and the pitch angle of the propeller 112a, which is detected by the pitch angle sensor 112g, are included in the data for comparison (operating state). Therefore, in a case where there is an operation pattern (record) in which the six values of the data for comparison respectively match the six items in the database 22a, a determination that it is normal is made, and in the other cases (in a case of not corresponding to any of the operation patterns at the normal time), a determination that it is abnormal is made.

For example, in a case where the rotational speed of the motor 111b, which is detected by the rotational speed sensor 111d, is Nu1, the torque of the motor 111b, which is calculated from the detection result of the current sensor 111e, is Tu1, the pitch angle of the propeller 111a, which is detected by the pitch angle sensor 111g, is Au1, the rotational speed of the motor 112b, which is detected by the rotational speed sensor 112d, is N11, the torque of the motor 112b, which is calculated from the detection result of the current sensor 112e, is T11, and the pitch angle of the propeller 112a, which is detected by the pitch angle sensor 112g, is Al1, since it corresponds to the operation pattern at the normal time, Pt1, a determination that the rotary wing unit 11 is normal is made.

Operation Example at Detection of Abnormality of Flight System

Next, an operation example at the time of detection of abnormality of the flight system according to this embodiment will be described with reference to FIG. 3. This abnormality detection operation is performed when the flying object 1 is flying. Further, the following steps are executed by the controller 2.

Figure 3:
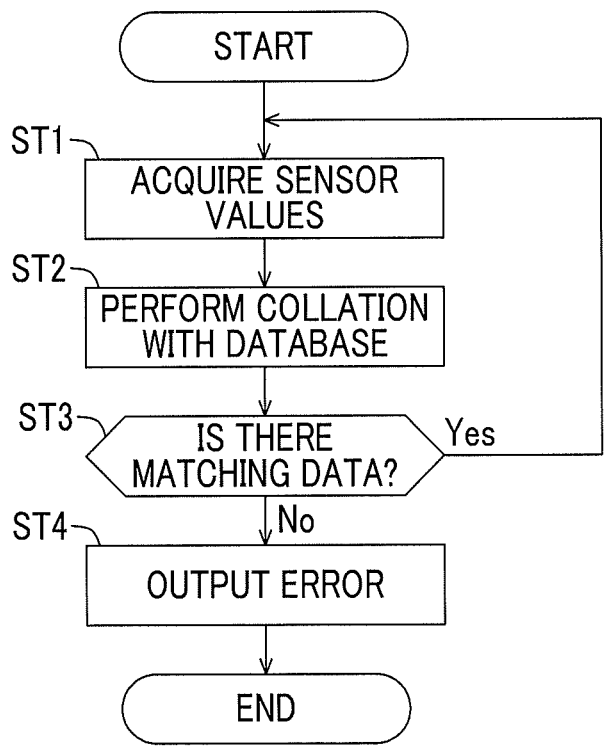
FIG. 3 is a flowchart for describing an operation example at the time of abnormality detection of the flight system according to the embodiment.

First, in step ST1 of FIG. 3, the detection results of the respective sensors of the rotary wing unit 11, which are transmitted from the flying object 1, are acquired, and the operating state is calculated based on the detection results of the respective sensors. This operating state is, for example, data for comparison based on six sensor values of the rotary wing unit 11, and corresponds to the current actual correlation between the propellers 111a, 112a. The operating states of all the rotary wing units 11 among the rotary wing units 11 are calculated.

Next, in step ST2, the operating states of all the rotary wing units 11 are collated with the database 22a. Then, in step ST3, a determination of whether or not there is data (operation pattern) matching the database 22a between the operation states of all the rotary wing units 11 is made. Then, in a case where a determination that there is data matching the database 22a between the operation states of all the rotary wing units 11 is made, since the correlation at the time of actual operation is normal in all the rotary wing units 11, the routine returns to step ST1. On the other hand, in a case where a determination that there is no data matching the database 22a between the operation states of any one of the rotary wing units 11, since the correlation at the time of actual operation of the rotary wing unit 11 is not normal, the routine proceeds to step ST4.

Next, in step ST4, the operator is notified of the abnormality of the rotary wing unit 11 by using the notification unit 25. As a specific example of the abnormality of the rotary wing unit 11, abnormality of the motors 111b, 112b, abnormality of the pitch angle adjustment units 111c, 112c, abnormality of the duct 113, abnormality of the respective sensors (the rotational speed sensors 111d, 112d, the current sensors 111e, 112e, and the pitch angle sensors 111g, 112g), or the like can be given.

Effects

In this embodiment, as described above, the abnormality of the rotary wing unit 11 is detected based on the correlation at the time of actual operation and the correlation at the time of normal operation accumulated in the database 22a, whereby it is possible to appropriately detect abnormality by using the correlation during operation, because the propellers 111a, 112a coaxially disposed influence each other during operation. That is, it is possible to detect various abnormalities by using the correlation between the propellers 111a, 112a during operation.

Further, in this embodiment, the duct 113 is provided in the rotary wing unit 11, and the propellers 111a, 112a are disposed in the duct 113. For this reason, in a case where the duct 113 is damaged, so that an air flow changes, the correlation between the propellers 111a, 112a during operation changes, and thus it is possible to detect abnormality. Therefore, it is possible to detect abnormality (for example, abnormality of the duct 113) that cannot be detected solely by individually monitoring the operation of the propellers 111a, 112a.

OTHER EMBODIMENTS

The embodiment disclosed herein is exemplification in all respects and is not a basis of a limited interpretation. Therefore, the technical scope of the present disclosure is not interpreted solely by the embodiment described above and is defined based on the statement of the claims. Further, all modifications within the meaning and scope equivalent to the claims are included in the technical scope of the present disclosure.

For example, in the embodiment described above, the example in which the flying object 1 is an unmanned rotorcraft is shown. However, there is no limitation thereto, and the flying object may be a manned rotorcraft. In this case, the controller may be integrally provided in the flying object.

Figure 4:
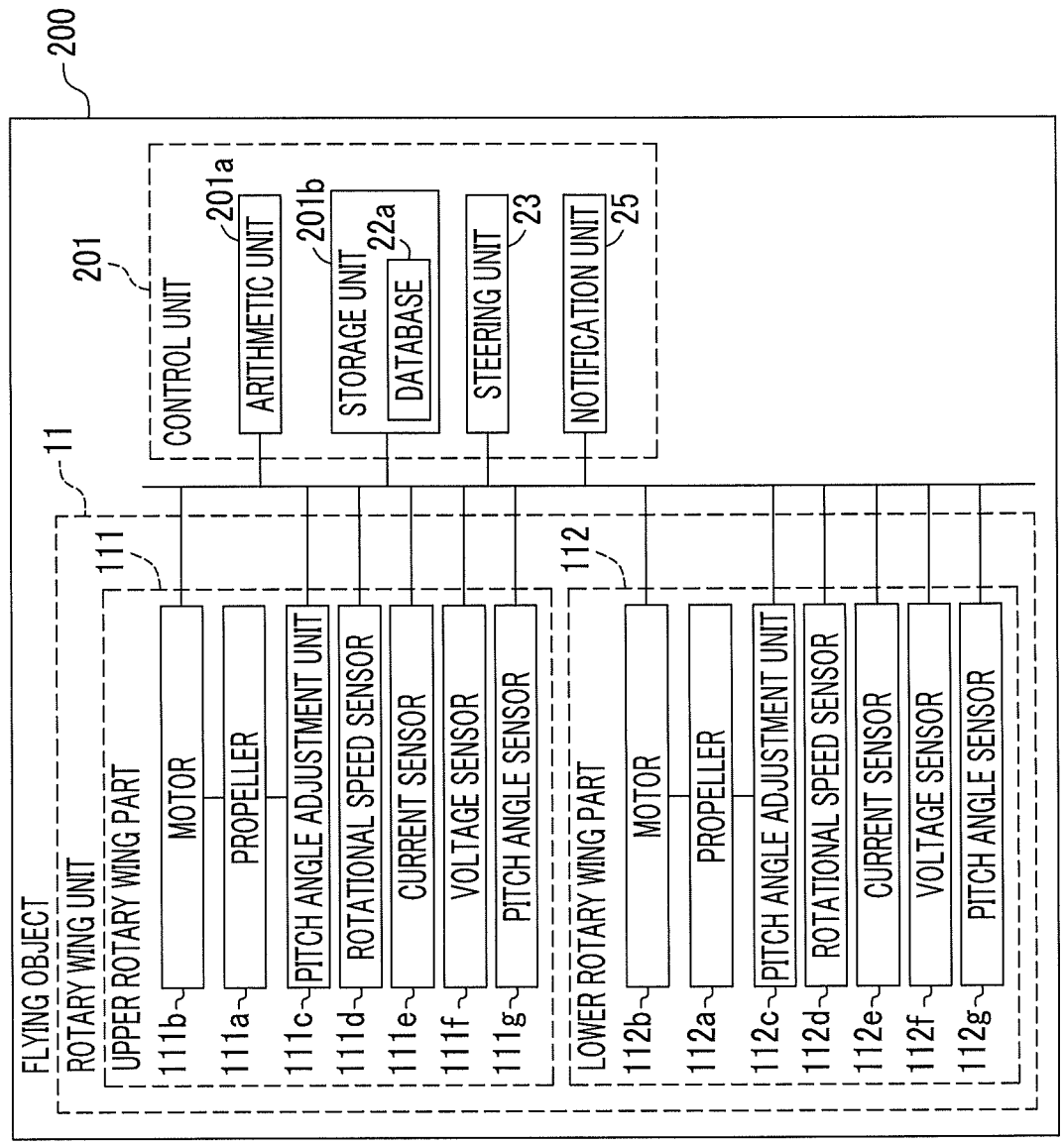
FIG. 4 is a block diagram showing an example of a flying object according to a first modification example of the embodiment.

Specifically, as in a flying object 200 of a first modification example shown in FIG. 4, a control unit 201 having the functions of the rotary wing control unit 12 and the controller 2 described above may be provided. The control unit 201 is configured to control the flight of the flying object 200 by controlling the rotary wing unit 11 and detect the abnormality of the rotary wing unit 11, based on the correlation (operating state). The control unit 201 includes an arithmetic unit 201a, a storage unit 201b, the steering unit 23, and the notification unit 25. The arithmetic unit 201a is configured to control the control unit 201 by executing arithmetic processing, based on various control programs, maps, or the like stored in the storage unit 201b. Various control programs, maps that are referred to when the various control programs are executed, or the like is stored in the storage unit 201b. Further, the database 22a is stored in the storage unit 201b. The control unit 201 is an example of the "abnormality detection device" and the "control device" according to the embodiment of the present disclosure, and the arithmetic unit 201a is an example of the "detection unit" and the "control unit" in the present disclosure.

Further, in the embodiment described above, the example in which the duct 113 is provided in the rotary wing unit 11 is shown. However, there is no limitation thereto, and the duct may not be provided in the rotary wing unit.

Further, in the embodiment described above, the example in which the pitch angle adjustment units 111c, 112c are provided and the flying object 1 is a variable pitch machine is shown. However, there is no limitation thereto, and the pitch angle adjustment unit may not be provided and the flying object may be a fixed pitch machine. In this case, the pitch angle of the propeller may not be set as an item of the database.

Further, in the embodiment described above, the example in which the database 22a is stored in the controller 2 is shown. However, there is no limitation thereto, and a configuration may be made such that the database is stored in a server device (not shown) and the controller communicates with the server device to performed collation with the database.

Further, in the embodiment described above, the example in which the rotary wing control unit 12 transmits the detection result of each sensor to the controller 2 and the controller 2 calculates the operating state, based on the detection result of each sensor, is shown. However, there is no limitation thereto, and a configuration may be made such that the rotary wing control unit calculates the operating state, based on the detection result of each sensor, and transmits the operating state to the controller 2.

Further, in the embodiment described above, the example in which the rotational speeds of the motors 111b, 112b, the torques of the motors 111b, 112b, and the pitch angles of the propellers 111a, 112a are set as the items of the database 22a is shown. However, there is no limitation thereto, and a configuration may be made such that at least one of the rotational speed of the motor, the torque of the motor, and the pitch angle of the propeller is set as the item of the database.

Further, in the embodiment described above, the example in which the operating state (data for comparison) is calculated based on the six sensor values of the rotary wing unit 11 is shown. However, there is no limitation thereto, and a configuration may be made such that the operating state is calculated taking into account the detection results of other sensors such as a voltage sensor.

Further, in the embodiment described above, the example in which the torque of the motor 111b (112b) is calculated based on the detection result of the current sensor 111e (112e) is shown. However, there is no limitation thereto, and a torque sensor that detects the torque of the motor may be provided.

Further, in the embodiment described above, the example in which the abnormality of the rotary wing unit 11 is detected by collating the correlation at the time of actual operation with the database 22a is shown. However, there is no limitation thereto, and a configuration may be made such that the abnormality of the rotary wing unit 11 is detected by substituting the correlation at the time of actual operation into an evaluation formula.

Further, in the embodiment described above, the example in which the correlation at the time of normal operation is accumulated in the database 22a is shown. However, there is no limitation thereto, and the correlation at the time of abnormal operation may be accumulated in the database. In this case, in a case where there is data matching the operation pattern at the time of abnormality, a determination that it is abnormal is made. Further, in a case where the cause of abnormality is registered in association with the operation pattern at the time of abnormality accumulated in the database, it is possible to specify the cause of the abnormality. For example, an operation pattern at the time of abnormality of the duct is accumulated in the database, and in a case of corresponding to the operation pattern, it is possible to detect it as abnormality of the duct. Both the correlation at the time of normal operation and the correlation at the time of abnormal operation may be accumulated in the database.

Further, in the embodiment described above, the example in which abnormality is detected using instantaneous data of the sensor values is shown. However, there is no limitation thereto, and a configuration may be made such that abnormality is detected using time series data of the sensor values. With such a configuration, even in a case where a response delay occurs at the time of acceleration and deceleration or a case where variation in data occurs during steady flight, it is possible to perform accurate abnormality detection.

Figure 5:
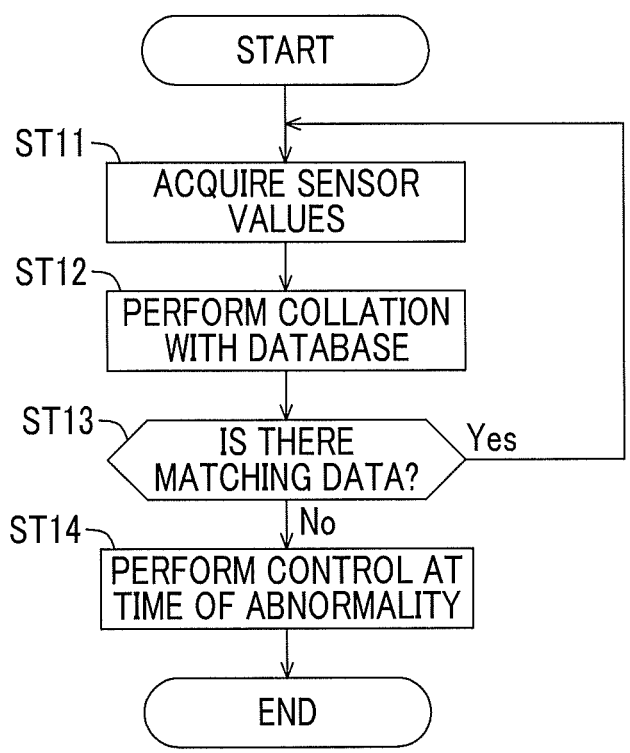
FIG. 5 is a flowchart for describing an operation example at the time of abnormality detection of a flight system according to a second modification example of the embodiment.

Further, as in a second modification example of the above embodiment shown in FIG. 5, a configuration may be made such that in a case where the abnormality of the rotary wing unit 11 is detected, the control at the time of abnormality is performed. Steps ST11 to ST13 of FIG. 5 are the same as steps ST1 to ST3 of FIG. 3, and thus the description thereof is omitted. In step ST14 of FIG. 5, the controller 2 instructs the flying object 1 to perform the control at the time of abnormality. As an example of the control at the time of abnormality, stopping the rotary wing unit 11 in which the abnormality is detected and continuing the flight by using the other rotary wing units 11 that are normal, transitioning to an emergency landing mode and performing landing with minimal control, and resetting the rotary wing control unit 12 to achieve normalization can be given.

Figure 6:
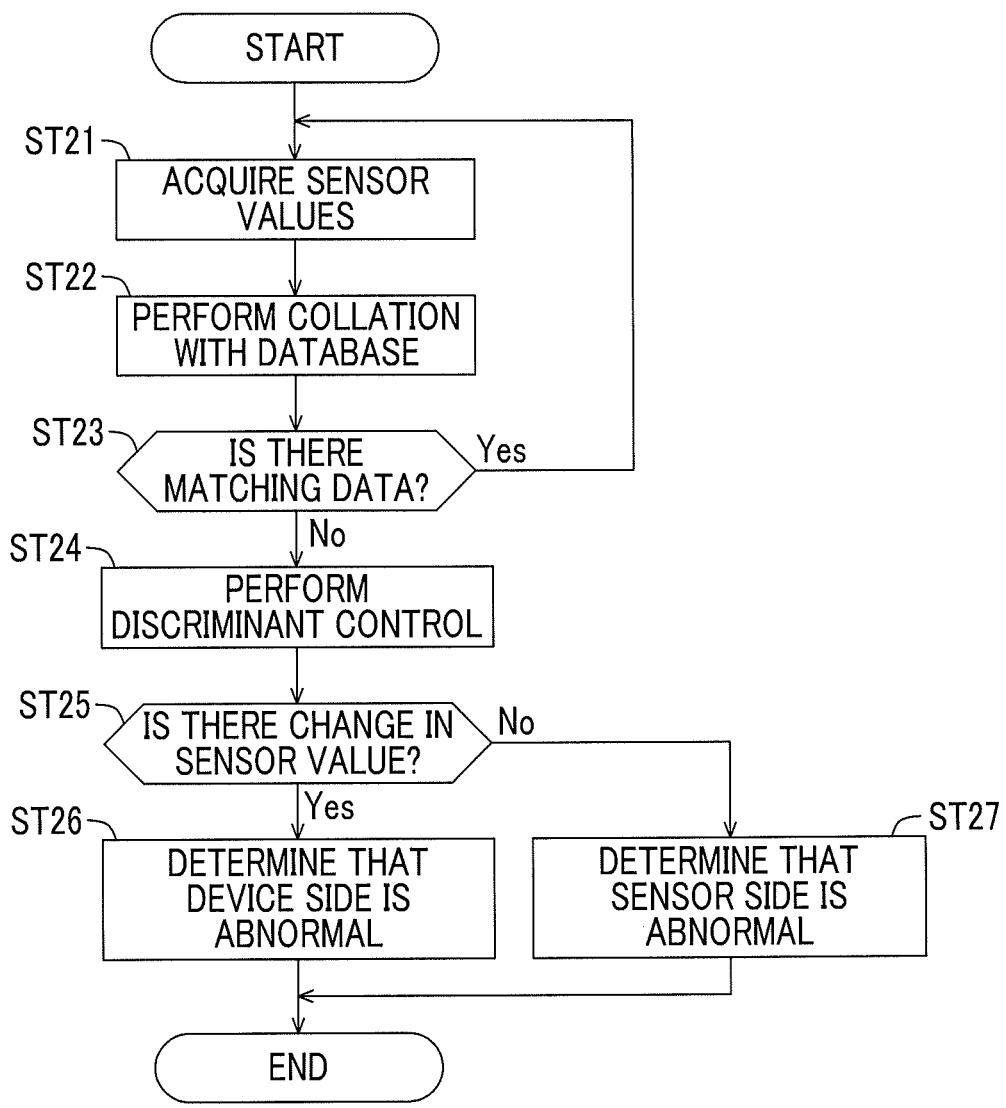
FIG. 6 is a flowchart for describing an operation example at the time of abnormality detection of a flight system according to a third modification example of the embodiment.

Further, as in a third modification example of the above embodiment shown in FIG. 6, a configuration may be made such that in a case where the abnormality of the rotary wing unit 11 is detected, isolation of the cause of the abnormality is performed. Steps ST21 to ST23 of FIG. 6 are the same as steps ST1 to ST3 of FIG. 3, and thus the description thereof is omitted. In step ST24 of FIG. 6, the controller 2 instructs the flying object 1 to perform discriminant control. As an example of the discriminant control, temporarily stopping the motor 111b or 112b, temporarily setting the pitch angle of the propeller 111a or 112a to zero, and the like can be given. Next, in step ST25, a determination of whether or not there is a change in the sensor value is made. Then, in a case where a determination that there is a change in the sensor value is made, in step ST26, a determination that the device side (the motors 111b, 112b and the pitch angle adjustment units 111c, 112c) is abnormal is made and the mode is transitioned to the emergency landing mode. On the other hand, in a case where a determination that there is no change in the sensor value is made, in step ST27, a determination that the sensor side (the rotational speed sensor 111d, 112d, the current sensor 111e, 112e, the pitch angle sensor 111g, 112g) is abnormal is made and the rotary wing control unit 12 is reset.

Embodiments in the present disclosure are applicable to an abnormality detection device that detects abnormality of a rotary wing unit in which a plurality of rotary wings is coaxially disposed, and a control device.

What is claimed is:

1. An abnormality detection device for a rotary wing unit, the rotary wing unit including a plurality of rotary wings that is coaxially disposed, the abnormality detection device comprising a controller configured to:
   acquire at least one of (i) a correlation at a time of normal operation between a first set of operation parameters related to a first rotary wing of the plurality of rotary wings and a second set of operation parameters related to a second rotary wing of the plurality of rotary wings, and (ii) a correlation at a time of abnormal operation between the first set of operation parameters and the second set of operation parameters; and
   detect abnormality of the rotary wing unit, based on a correlation at a time of actual operation between the first and second sets of operation parameters and at least one of the correlation at the time of normal operation and the correlation at the time of abnormal operation.

2. The abnormality detection device according to claim 1, wherein:
   the rotary wing unit includes a duct; and
   the rotary wings are disposed in the duct.

3. The abnormality detection device according to claim 1, wherein the operation parameters include a rotational speed of a motor that rotates the rotary wing.

4. The abnormality detection device according to claim 1, wherein:
   the rotary wing unit is configured to change a pitch angle of the rotary wing; and
   the operation parameters include a pitch angle of the rotary wing.

5. A control device for a flying object, the flying object including a plurality of rotary wing units, each of the rotary wing units including a plurality of rotary wings coaxially disposed, the control device comprising a controller configured to:
   acquire at least one of (i) a correlation at a time of normal operation between a first set of operation parameters related to a first rotary wing of the plurality of rotary wings and a second set of operation parameters related to a second rotary wing of the plurality of rotary wings, and (ii) a correlation at a time of abnormal operation between the first set of operation parameters and the second set of operation parameters;
   detect abnormality of the rotary wing unit, based on a correlation at the time of actual operation between the first and second sets of operation parameters and at least one of the correlation at the time of normal operation and the correlation at the time of abnormal operation; and
   perform control at the time of abnormality in a case where the abnormality of the rotary wing unit is detected.

* * * * *